US006560454B2

(12) United States Patent
Helle et al.

(10) Patent No.: US 6,560,454 B2
(45) Date of Patent: May 6, 2003

(54) SYSTEM AND METHOD FOR DELIVERY AND UPDATING OF DATA TRANSMITTED TO A MOBILE TERMINAL

(75) Inventors: Seppo Helle, Paimio (FI); Topi Koskinen, Tampere (FI)

(73) Assignee: Nokia Corp., Tampere (FI)

( * ) Notice: Subject to any disclaimer, the term of this patent is extended or adjusted under 35 U.S.C. 154(b) by 0 days.

(21) Appl. No.: 09/866,624

(22) Filed: May 30, 2001

(65) Prior Publication Data

US 2002/0183043 A1 Dec. 5, 2002

(51) Int. Cl.⁷ .............................................. H04M 11/10
(52) U.S. Cl. ...................... 455/412; 455/418; 455/422; 709/203
(58) Field of Search ................................. 455/412, 418, 455/419, 422, 517, 3.04; 709/203, 217, 219, 201; 340/7.29, 7.48, 7.52

(56) References Cited

U.S. PATENT DOCUMENTS

| 5,493,285 A | * | 2/1996 | Yoshizawa | 340/7.51 |
| 5,555,446 A | * | 9/1996 | Jasinski | 340/7.21 |
| 5,758,332 A | * | 5/1998 | Hirotani | 707/1 |
| 5,978,833 A | * | 11/1999 | Pashley et al. | 709/200 |
| 6,055,413 A | * | 4/2000 | Morse et al. | 340/7.43 |
| 6,073,075 A | * | 6/2000 | Kondou et al. | 340/988 |
| 6,167,253 A | * | 12/2000 | Farris et al. | 455/412 |
| 6,233,452 B1 | * | 5/2001 | Nishino | 455/435 |
| 6,236,661 B1 | * | 5/2001 | Ballard | 370/410 |

\* cited by examiner

Primary Examiner—William Trost
Assistant Examiner—Simon Nguyen
(74) Attorney, Agent, or Firm—Antonelli, Terry, Stout & Kraus, LLP

(57) ABSTRACT

A system, method and computer program for accessing, downloading, storing, and retrieving information from a plurality of content providers on the Internet using a cellular terminal. This cellular terminal has an information finder to find and download items of information from content providers and store the information in a memory of the cellular terminal. These topics and items of information have a best before stamp associated with them. Upon expiration of the best before stamp, the item of information is deleted from the cellular terminal memory. The topic or item may be automatically updated by the latest edition of the information without user intervention when an update period expires.

19 Claims, 8 Drawing Sheets

FIG. 3

AREAS OF INTEREST

| | |
|---|---|
| ☐ | DOMESTIC NEWS |
| ☐ | INTERNATIONAL NEWS |
| ☐ | SPORTS GENERAL |
| ☐ | BASEBALL |
| ☐ | GOLF |
| ☐ | ECONOMY |
| ☐ | POPULAR MUSIC |

⎫ 300

CONTENT TYPE

| | |
|---|---|
| ○ | TEXT ONLY |
| ○ | TEXT AND IMAGES |

⎫ 310

CONNECTION FREQUENCY

| | |
|---|---|
| ○ | 3 HOURS |
| ○ | 1 HOUR |
| ○ | 20 MINUTES |

⎫ 320

PERSONAL EXPIRATION TIME

| | |
|---|---|
| ○ | 6 HOURS |
| ○ | 24 HOUR |
| ○ | 72 MINUTES |

⎫ 330

US 6,560,454 B2

SYSTEM AND METHOD FOR DELIVERY AND UPDATING OF DATA TRANSMITTED TO A MOBILE TERMINAL

FIELD OF THE INVENTION

The invention relates to a system and method for the delivery and updating of data transmitted to a mobile terminal. More particularly, the invention is a system and method in which a user may specify data desired from a supplier or content provider and have that data periodically updated when either the content provider or the user indicates so.

BACKGROUND OF THE INVENTION

With the explosion in Internet access and usage individuals have discovered that they may now receive a large amount of information in their homes and offices almost immediately from any number of sources. These sources include everything from the latest news, weather, and sports to stocks, bond and commodity prices. Currently, a typical Internet user would have a browser installed in his local computer or server such as Internet Explorer™ or Netscape™. Using this browser, the user would access an Internet service provider, such as America-On-Line (AOL™), via a modem over the local public switched telephone network (PSTN). Once logged onto the Internet server, the user may utilize one of the many search engines, such as Yahoo™ or Lycos™, to specify search terms. The user may also use a web crawler, spider or robot to attempt to find a product, service or information desired. The search engine or web crawler would then respond with a list of web sites which matched the search terms the user provided. The user would then log onto a web site and view the products or services available for sale or receive the information desired. Further, if the user discovers a web site he prefers, the user may store the universal resource locator (URL) in a favorites' directory for later quick access. Finally, due partly to the availability of the Internet, day trading has become very popular. Day traders will often sit in front a monitor and watch as trades in stocks, bonds, currencies, commodities and options occur on the major markets. These day traders will often make numerous purchases and sales in a given day. However, the ability to monitor the trading on a major market such as the New York Stock Exchange (NYSE) is often difficult for the average user since it entails monitoring trading occurring in hundreds of stocks simultaneously. The volume of information that would have to be received would easily exceed the capability of 56K modem.

To overcome this problem, day traders and others often will turn to broadband cable Internet access such as provided by @Home^SM or join a service which has computers set up at a given location that may be used by their members. If a broadband cable Internet service is used, the improvement in throughput can be significant. This improvement in throughput is possible through the use of coax or fiber optic cable. However, the price is also significantly higher than Internet access available through an Internet service provider, such as AOL™, using the local public switched telephone network (PSTN). Further, whether using a trading service or a broadband cable Internet service, the user is often limited to a single site where they can access the desired information.

Recently cellular phone manufacturers have been making available Wireless Access Protocol (WAP) and Hypertext Markup Language (HTML) capable cellular phones for Internet access wherever digital cellular phone access is available. Using such a WAP-capable phone, a user no longer is tied to a fixed location in order to access the Internet. In addition, a few WAP capable cellular telephones are available with significant processor, display and memory capability that rival that seen in a personal digital assistant (PDA). However, unlike other forms of Internet access, three fundamental problems exist for a person who desires to access the Internet using a cellular telephone. First, a cellular telephone still has a relatively slow transmission rate. Second, even though the cost per minute access charges have significantly fallen, cellular phone rates are still generally higher than other method of interfacing to the Internet. Third, cellular phones still have significantly less memory than personal computers and thus can hold less data retrieved from web sites. Combining the relatively slow transmission rate with the high cost of access for a cellular phone makes searching and accessing information on the Internet relatively costly. In addition, very often individuals using the Internet will want to repeatedly access a web site in order to determine if any changes in information have taken place. For example, an individual may wish to know if there is a breaking news event, or a change in a sporting event score. Presently, such an individual would have to repeatedly access the web page of the site he is interested in. All too often that individual would discover that there is no update or change in events.

Therefore, what is needed are a system and method that can more effectively utilize the enhanced processor power and memory available to higher end cellular telephones while minimizing access time spent searching the Internet utilizing a cellular phone. This system and method should be able to store information from Internet web sites that a user is interested in within the memory of the cellular phone itself. Further, this system and method should provide a mechanism whereby the user is assured that the information contained in memory of his cellular phone is up-to-date.

SUMMARY OF THE INVENTION

An embodiment of the present invention provides for a method and computer program for accessing, downloading, storing, and retrieving information from content providers using a cellular terminal. This method and computer program begins by selecting at least one of several topics and items of information available from content providers on the Internet using the cellular terminal. Then searching the Internet for content providers having the topics and items of information. Downloading the topics and items of information to memory in the cellular terminal by the content providers and time stamping each item or topic of information with a best before time stamp. Specifying by a user of the cellular terminal an update period for the topics or items of information. Thereafter, checking periodically the best before time stamp and update period. Then eliminating any of the topics or items of information from the memory of the cellular terminal when the best before stamp has expired.

Further, an embodiment of the present invention which is a system for accessing, downloading, storing, and retrieving information from a plurality of content providers on a cellular terminal. This system has a cellular terminal to communicate to a cellular network and the Internet. The cellular terminal has an information finder to search the Internet for items of information having either an update period or a best before time stamp associated with the topics or items of information. The cellular terminal also has a news finder data file to store the items of information with the associated update period or a best before time stamp in memory of the cellular terminal. The cellular terminal also has a time stamp check module to check the update period or a best before time stamp and delete the item of information from the memory of the cellular terminal when the best before time stamp has expired.

These and other features of this device, method and computer program will become more apparent from the following description when taken in connection with the accompanying drawings which show, for purposes of illustration only, examples in accordance with the present invention.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be understood that the same is by way of illustration and example only and the invention is not limited thereto. The spirit and scope of the present invention are limited only by the terms of the appended claims.

The following represents brief descriptions of the drawings, wherein:

FIG. 3 is an example of a display that may be provided on a cellular terminal 10 depicting areas of interest, content type, and updated frequency selectable by a user in an example embodiment of the present invention;

DETAILED DESCRIPTION

Figure 1:
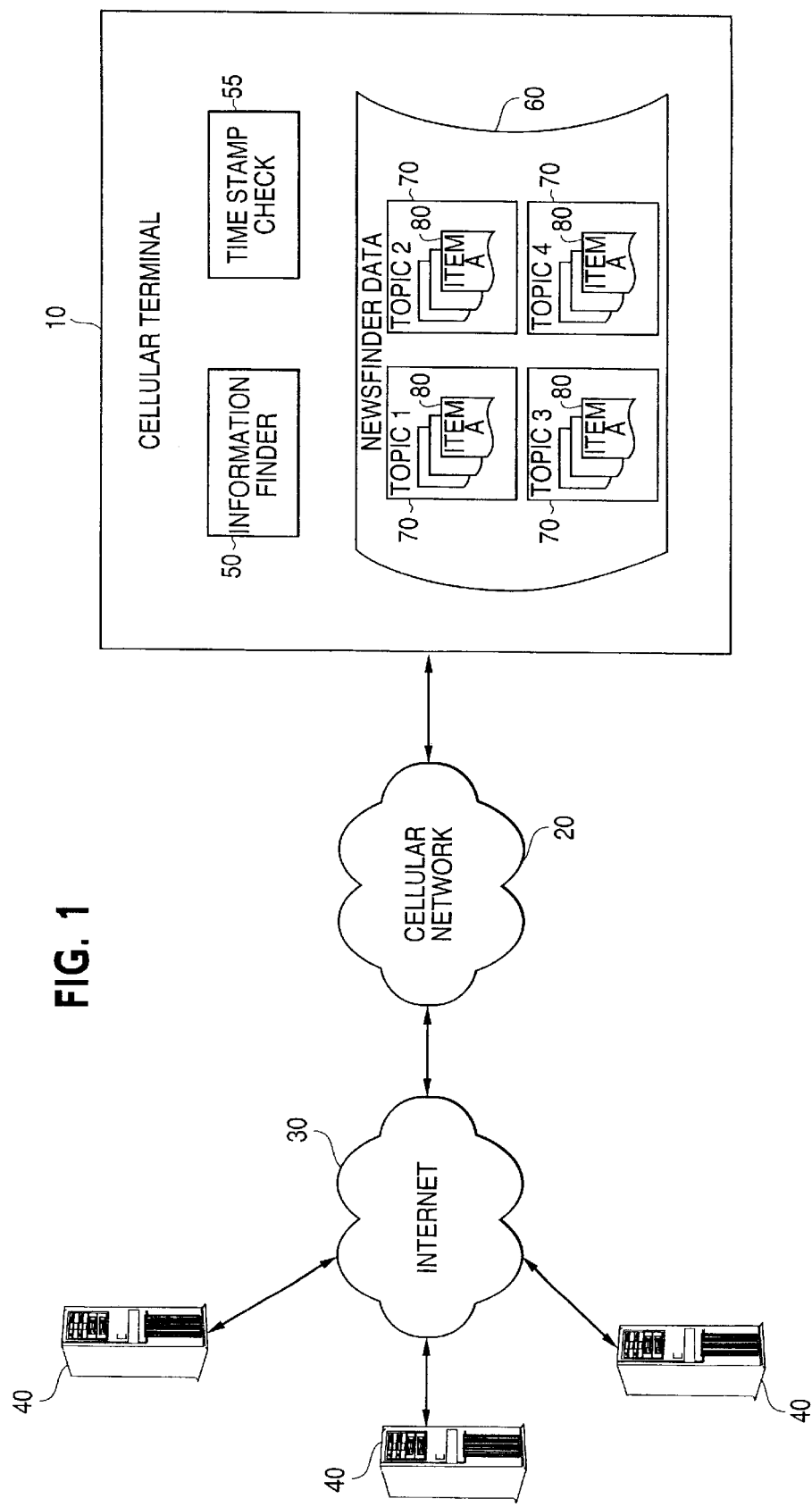
FIG. 1 is an example of an overall system diagram of an embodiment of the present invention.

Before beginning a detailed description of the subject invention, mention of the following is in order. When appropriate, like reference numerals and characters maybe used to designate identical, corresponding or similar components in differing figure drawings. Further, in the detailed description to follow, exemplary sizes/models/values/ranges may be given, although the present invention is not limited to the same.

FIG. 1 is an example of an overall system diagram of an embodiment of the present invention showing the three major components. A cellular terminal 10 communicates via cellular network 20 to Internet 30 via an Internet service provider (not shown) to content providers 40. The cellular terminal 10 comprises an information finder 50 used to search the Internet 30 for requested items 80 of information. A news finder data file 60 in which items 80 of information are grouped by topic 70 and contained within the memory of the cellular terminal 10. A time stamp check module 55 is utilized to determine if the items 80 of information are current based on at least one time stamp associated with items 80. The time stamp associated with each item 80 may be generated by the content provider 40 or may be specified by the user of the cellular terminal 10.

Still referring to FIG. 1, utilizing the information finder 50 a user of the cellular terminal 10 is able to select topics 70 and items 80 of information that interest him and have the information finder 50 search the Internet 30 for such items 80. Once discovered these items 80 would be stored in the memory of the cellular terminal 10 in the news finder data file 60. Thereafter, the time stamp check 55 would periodically determine whether these items 80 are still valid and, as will be discussed in further detail ahead, will update these items based on the associated time stamp. These and other details and embodiments of the invention will be discussed in further detail in reference to FIGS. 2 though 8.

Figure 2:
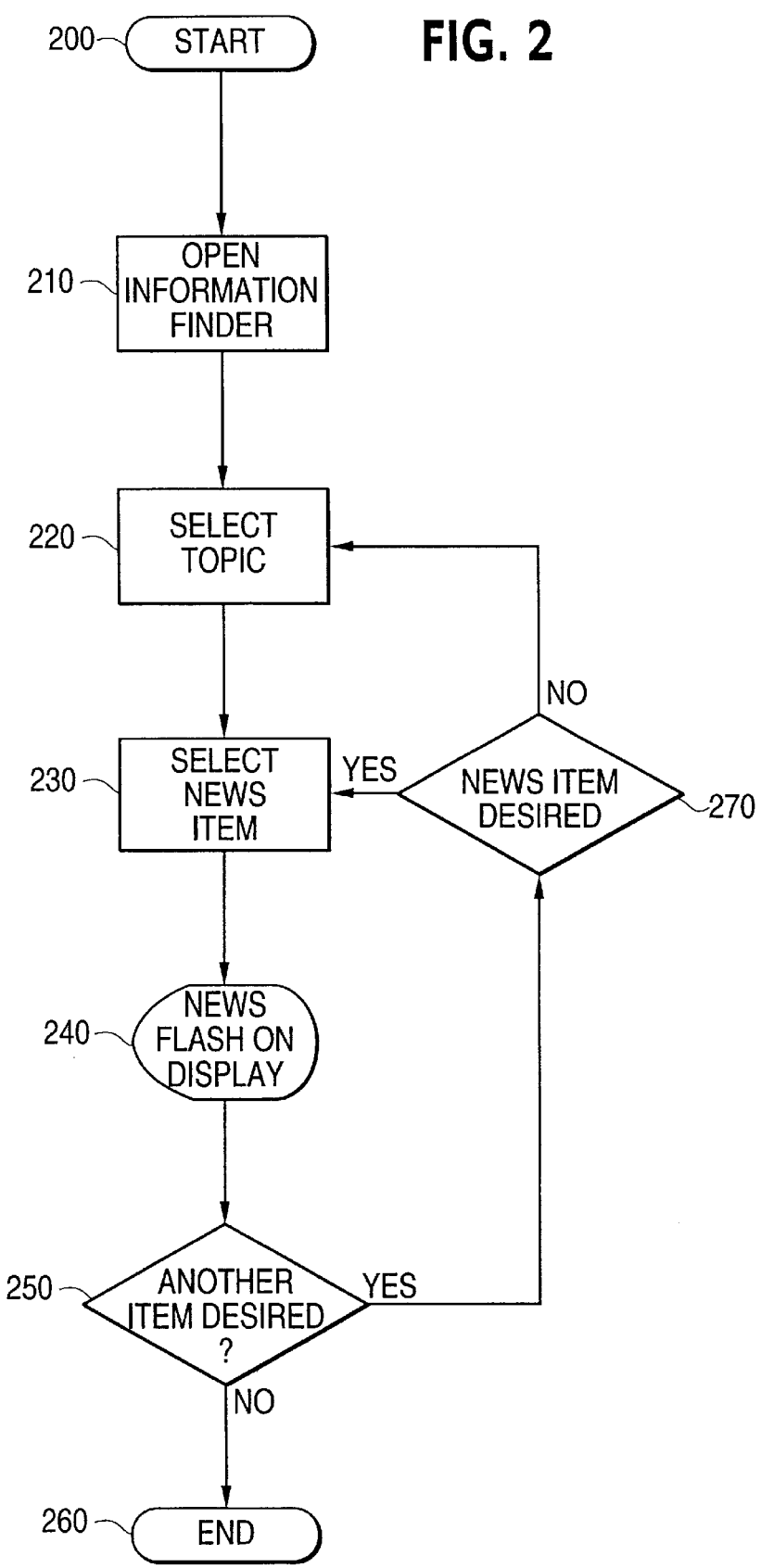
FIG. 2 is a flowchart of the information finder 50 shown in FIG. 1 in an example embodiments of the present invention.

FIG. 2 is a flowchart of the information finder 50 shown in FIG. 1 in an example embodiments of the present invention. Processing begins in operation 200 and immediately proceeds operation 210 where the information finder 50 is opened. Thereafter, in operation 220, a topic 70 is selected as depicted and further discussed in reference to FIG. 3. In operation 230, a specific news item 80 is selected by the user. This news item 80 would be a subset of the topic 70 selected. For example, if the topic 70 selected is the economy, then the item may be a market index or portfolio. Thereafter, in operation 240 the specific news item 80 is displayed on the cellular terminal 10 screen. Processing then proceeds to operation 250 where it is determined if another item 80 is desired by the user. If another item 80 is desired, then processing proceeds to operation 270. In operation 270, if this item 80 falls within the same topic 70, then processing proceeds from operation 270 to operation 230 were another news item 80 is selected. However, if a new topic 70 is desired instead, processing then proceeds to operation 220. If in operation 250 no further item 80 is desired, processing then proceeds to operation 260 were processing terminates.

FIG. 3 is an example of a display that may be provided on a cellular terminal 10 depicting areas of interest/topics 300, content type 310, connection frequency 320 and personal expiration time 330 selectable by a user in an example embodiment of the present invention. The user in this selection of topic 300 maybe presented with the example display as depicted in FIG. 3. The user would arrange possible topics 300 to pick from including everything from domestic news to popular music. In addition, the user may select content type 310 which may indicate text only or text and images. In addition, the user may specify a connection frequency 320. This connection frequency 320 would be the amount of time that would elapsed before the cellular terminal 10 would request updates from content providers 40. Further, a personal expiration time 330 is provided which allows the user to indicate a maximum period of time an item 80 may be retained in the memory of the cellular terminal 10. This may be particularly useful when memory is limited in the cellular terminal 10 or the user does not old information retained for a long period of time.

Figure 4:
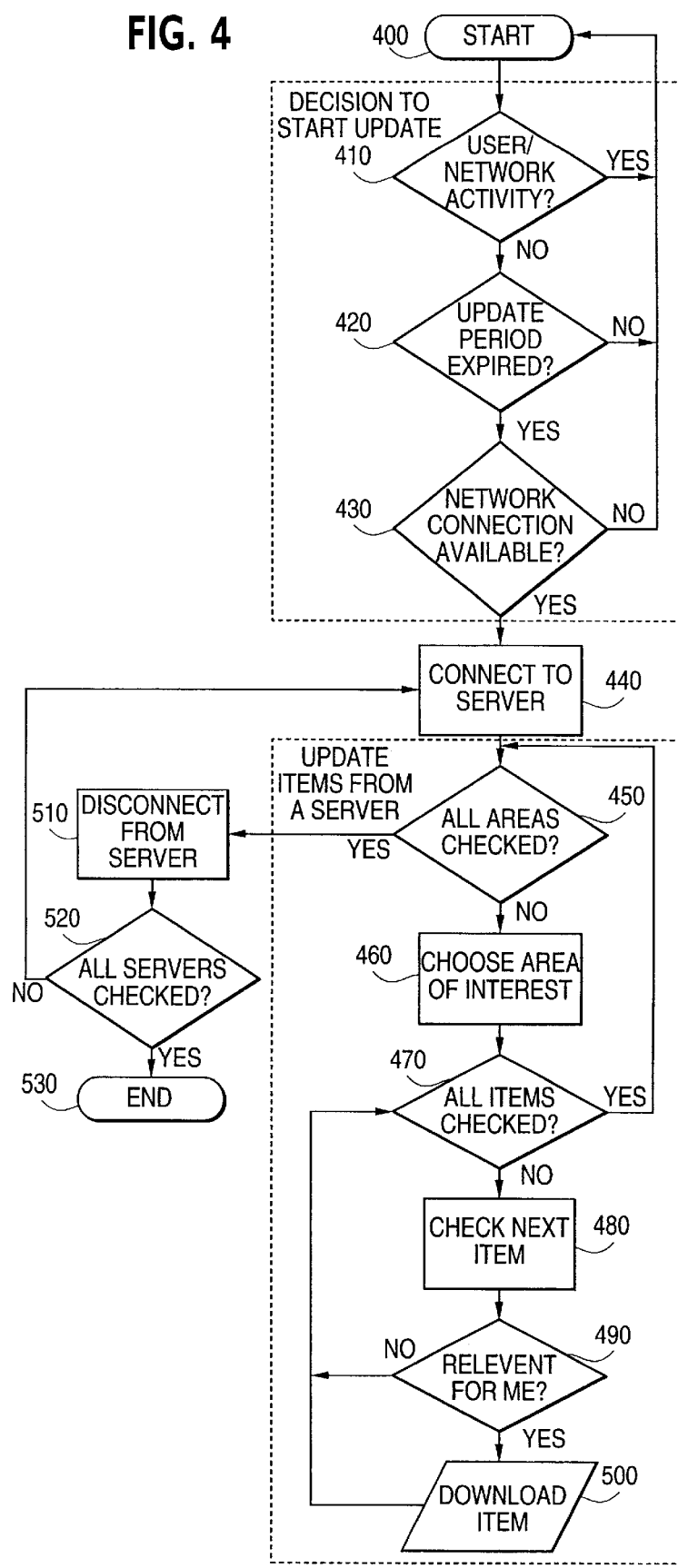
FIG. 4 is an example flowchart illustrating accessing and updating information by the cellular terminal 10 in an example embodiment of the present invention.

FIG. 4 is an example flowchart illustrating accessing and updating of information by the cellular terminal 10 in an example embodiment of the present invention. Processing begins in operation 400 and immediately proceeds to operation 410 where it is determined if there is either user or network activity. If there is user or network activity, this would indicate that the cellular terminal 10 is being used for some other purpose, such as a cellular telephone call, and therefore processing loops back to operation 400. However, if there is no user or network activity, then processing proceeds to operation 420. In operation 420, it is determined whether an update period has expired for a particular topic 70 or item 80. This update period would have been selected by the user as indicated in FIG. 3. If an update period is associated with the topic 70 or item 80 has not expired, then processing again loops back to operation 400. However, if an update period has expired, then processing proceeds to operation 430 where it is determined if a network connection is available. If a network connection is not available then processing again loops back to operation 400. However, if a network connection is available, then processing proceeds to operation 440. In operation 440, a connection to a content provider 40 is established. Thereafter, processing proceeds to operation 450 to determine if all areas/topics 70 have been checked. If all areas and topics 70 have not been check then processing proceeds to operation 460 were a topic 70 is selected by the system for checking. Thereafter, in operation 470 it is determined if all topics 70 and items 80 have been checked. If all items 80 have not been checked, then processing proceeds to operation 480 in which the next item within topic 70 is checked. Thereafter, processing proceeds to operation 490 where it is determined if a particular item 80 is relevant to the user. Items 80 are relevant to the user when either the item 80 applies to the user's personal subscription attributes and they are not relevant when the specific item 80 has been downloaded previously and does not require updating. Updating may be accomplished by the content provider 40 assigning an identification number to the item 80 which is check against that in the memory of the cellular terminal 18. If the item 80 is relevant to the user processing proceeds to operation 500 where the item 80 is downloaded into the memory of the cellular terminal 10. Thereafter, either when the item 80 is not relevant to the user in operation 490 or the item 80 is downloaded in operation 500, processing loops back to operation 470. In operation 470, if all items 80 have been checked then processing loops back to operation 450. In operation 450, if all topics 70 have been checked, then processing proceeds to operation 510. In operation 510, the cellular terminal 10 is disconnected from the content provider 40 or news finder server 35. Thereafter, processing proceeds operation 520 where it is determined if all content providers 40 or servers 35 have been checked. If all content providers 40 or servers 35 have not been checked then processing loops back to operation 440. Otherwise, processing proceeds operation 530 where processing terminates.

Figure 5:
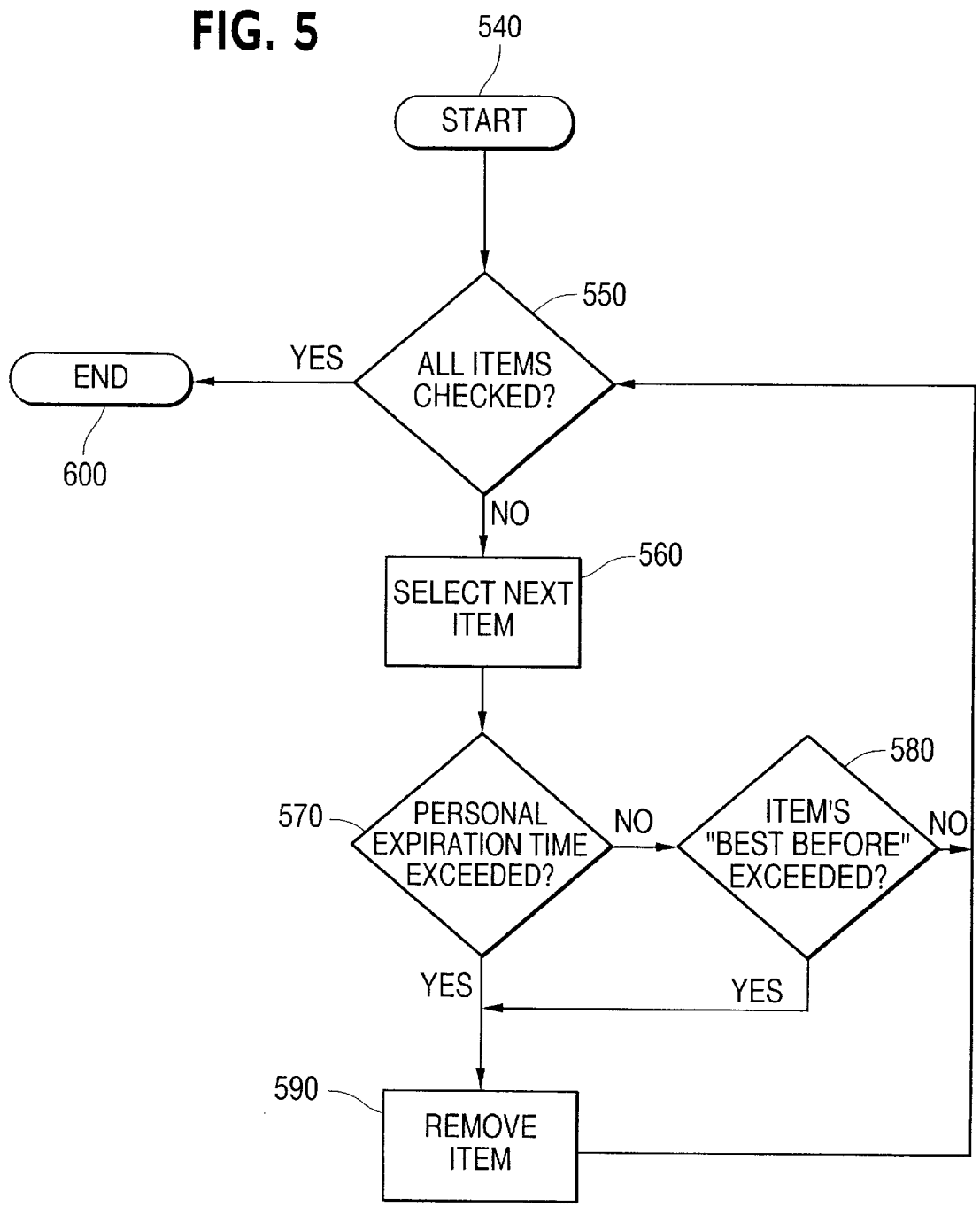
FIG. 5 is an example flowchart illustrating the operations performed by the time stamp check module 55 contained in the cellular terminal 10, shown in FIG. 1.

FIG. 5 is an example flowchart illustrating the operations performed by the time stamp check module 55 contained in the cellular terminal 10, shown in FIG. 1. The time stamp check module 55 begins execution in operation 540 and immediately proceeds operation 550. In operation 550, it is determine whether all items 80 are checked. If all items 80 have not been checked then processing proceeds operation 560. In operation 560, the next item 80 is selected. Processing then proceeds to operation 570 where the personal expiration time 330, illustrated in FIG. 3, is checked and determined if it has expired. If the user's personal expiration time 330 has not expired, then processing proceeds to operation 580. In operation 580, a best before time stamp associated with item 80 is checked. As previously discussed, this time stamp is generated by the content provider 40 and is meant to provide a time frame or limit in which information is considered valid. If this best before time stamp has not expired then processing loops back to operation 550. However, if the best before time stamp has been exceeded in operation 580 or if the user's personal expiration time 330 has been exceeded in operation 570 then processing proceeds to operation 590. In operation 590, item 80 is removed from the memory of the cellular terminal 10.

Still referring to FIG. 5, if the best before time stamp has not been exceeded in operation 580 or the item 80 was removed in operation 590, then processing loops back to operation 550. If in operation 550 all items 80 have been checked then processing proceeds to operation 600 where processing terminates.

Figure 6:
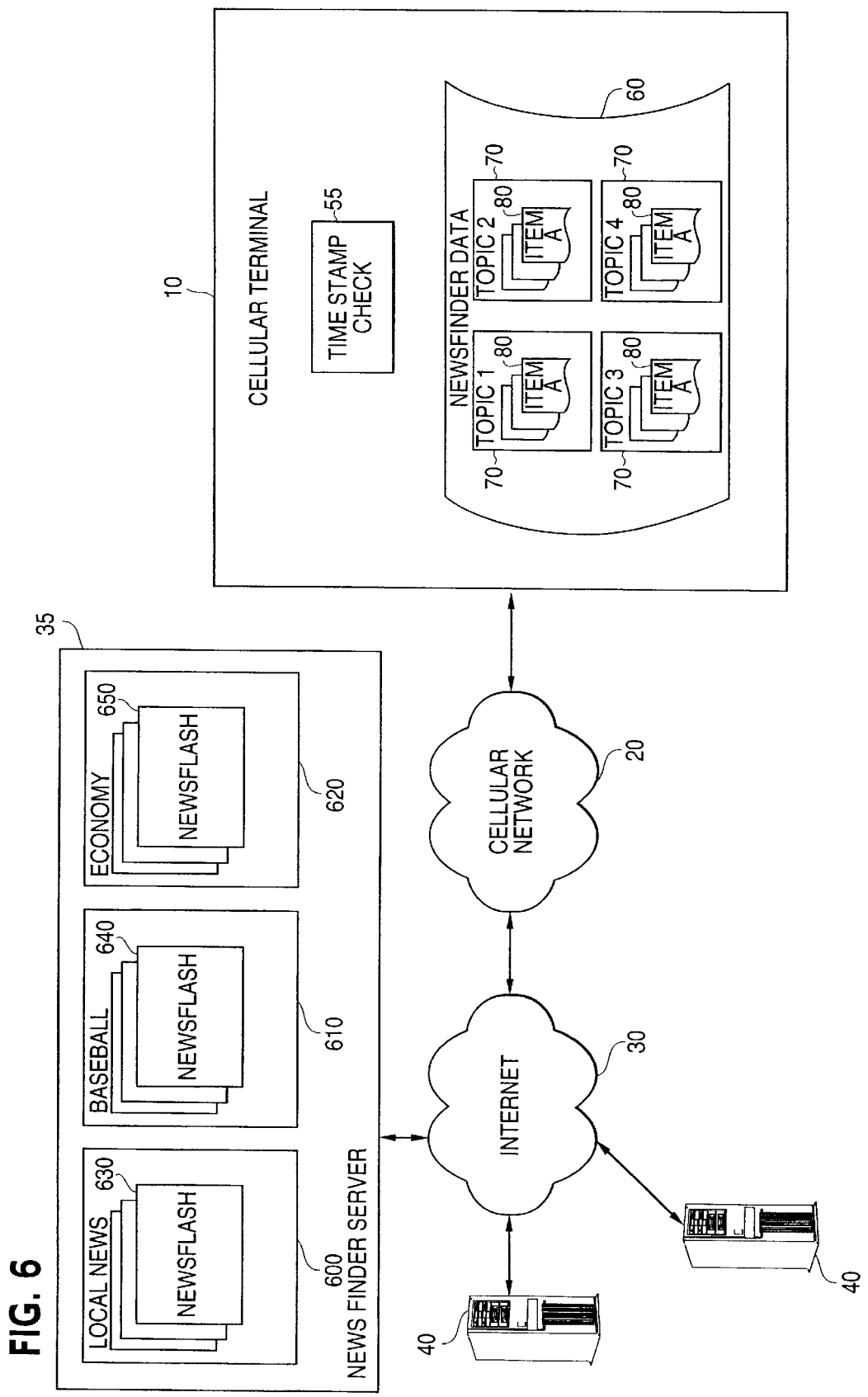
FIG. 6 is an alternate example of an overall system diagram of an embodiment of the present invention in which the information finder 50 resides in a server 35 connected to the Internet 30.

FIG. 6 is an alternate example of an overall system diagram of an embodiment of the present invention in which the information finder 50 resides in a server 35 connected to the Internet 30. FIG. 6 is similar to FIG. 1 with the exception of the removal of the information finder 50 from the cellular terminal 10 and the placement of the news application finder 50 in a separate news finder server 35. The news finder data file 60 still remains in the cellular terminal 10. Therefore, only the differences between FIG. 6 and FIG. 1 will be discussed in detail.

Still referring to FIG. 6, the news finder server 35 differs from other embodiments in that it would service several cellular terminal's 10 simultaneously. Therefore, cellular terminals 10 would still specify topics 70, as illustrated in FIG. 1, and news finder server 35 would access content providers 40 for specific items 80. As a representative example, news finder server 35 would contain items 80 such as local news 600, baseball 610, and the economy 620. Within each of these respective topics 70 would be contained news flashes 630, 640, and 650. These topics 70 comprising example local news 600, baseball 610, and economy 620, would be downloaded to cellular terminal 10 as items 80 for specific topics 70, as illustrated in FIG. 1. Using this alternate embodiment in FIG. 6, the processing required by cellular terminal 10 is off loaded onto a separate news finder server 35. As would be appreciated by one of ordinary skill in the art, this news finder server 35 is not limited to being connected to the Internet 30. Instead, this news finder server 35 may be provided by the Internet access provider or the cellular network 20. However, the processes and operations shown in FIGS. 2 through 5 would remain the same.

Figure 7:
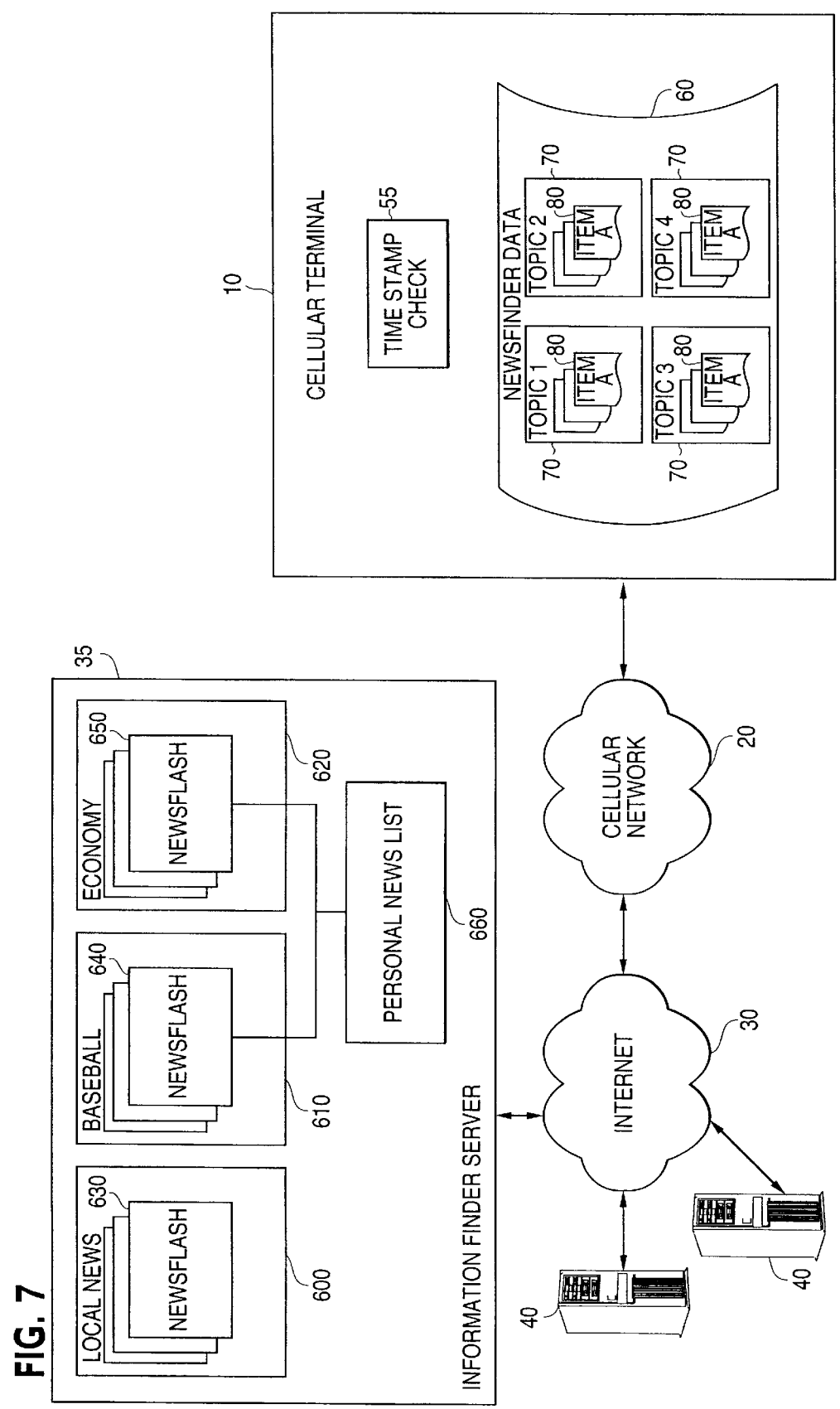
FIG. 7 is an alternate example of an overall system diagram of an embodiment of the present invention in which the information finder 50 resides in a server 35 connected to the Internet 30 and contains a personal news list 660.

FIG. 7 is an alternate example of an overall system diagram of an embodiment of the present invention in which the information finder 50 resides in a server 35 connected to the Internet 30 and contains a personal news list 660. FIG. 7 is similar to FIG. 6, therefore only the relevant differences will be discussed in detail. Added to the information finder server 35 is a personal news list 660. This personal news list 660 is unique for each individual user. The personal news list 660 would contain items 80 which are of interest to the particular user. Therefore, rather than searching the entire contents of information finder server 35, the cellular terminal 10 need only access the personal news list 660. The process for access and manipulation of the personal news list 660 is discussed in further detail ahead in FIG. 8.

Figure 8:
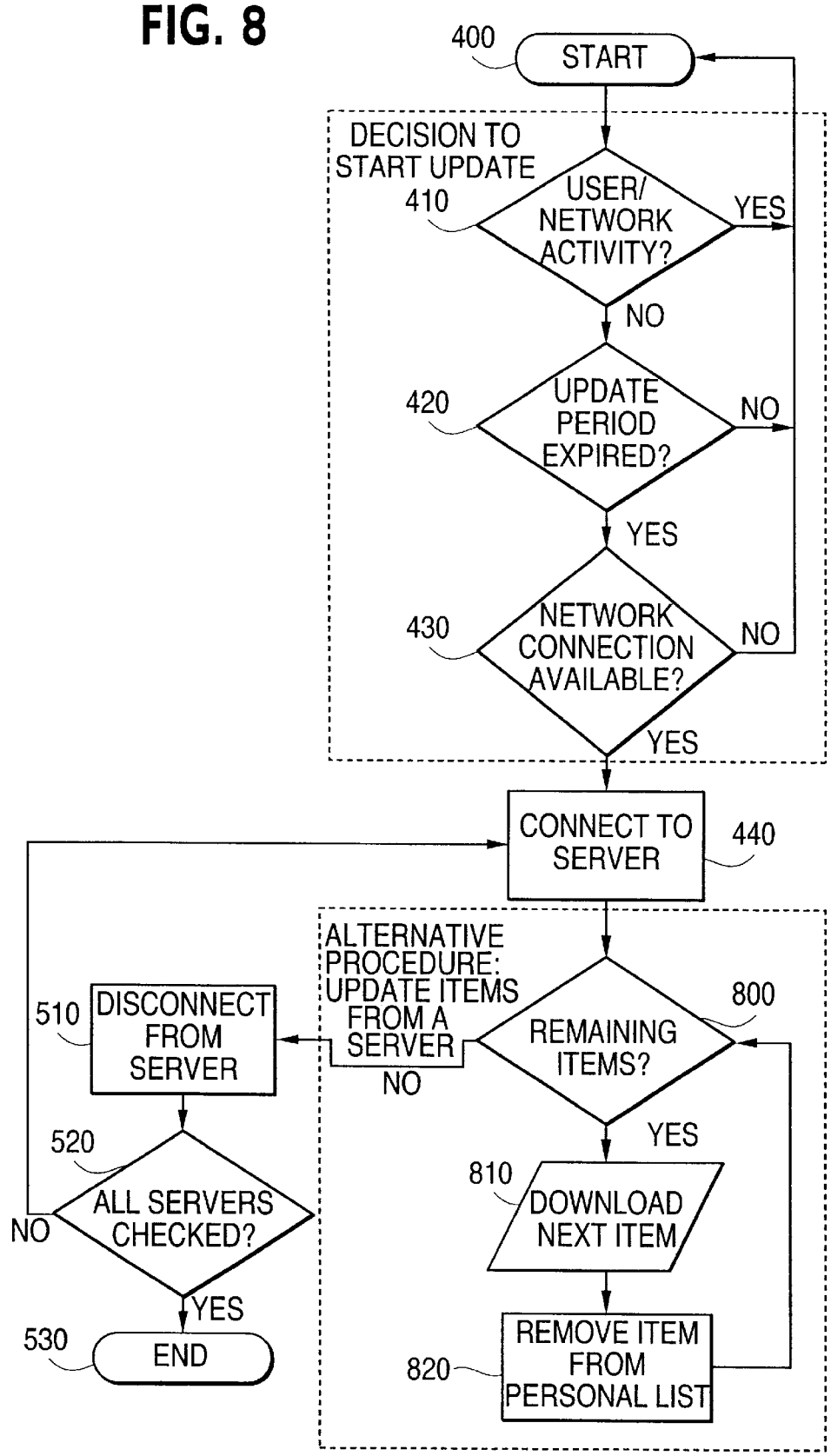
FIG. 8 is an example flowchart illustrating accessing and updating information by the cellular terminal 10 using the personal news list 660 in an example embodiment of the present invention.

FIG. 8 is an example flowchart illustrating accessing and updating information by the cellular terminal 10 using the personal news list 660 in an example embodiment of the present invention. FIG. 8 is similar to FIG. 4 with the exception that operations 800 through 820 are substituted for operations 450 through 500 in FIG. 4. This substitution takes place in order to take advantage of the personal news list 660 provided in the news finder server 35.

Still referring to FIG. 8, processing begins in operation 400 and immediately proceeds operation 410 where it is determined if there is either user or network activity. If there is user or network activity this would indicate that cellular terminal 10 is being used for some other purpose and therefore processing loops back to operation 400. However, if there is no user or network activity then processing proceeds to operation 420. In operation 420, it is determined whether an update period has expired for a particular item 80. This update period 320 would have been selected by the user as indicated in FIG. 3. If an update period 320 associated with the item 70 has not expired, then processing again loops back to operation 400. However, if an update period 320 has expired then processing proceeds operation 430 where it is determined if a network connection is available. If a network connection is not available then processing again loops back to operation 400. However, if a network connection is available then processing proceeds to operation 440. In operation 440, a connection to a content provider 40 is established. Thereafter, processing proceeds to operation 800 where the personal news list 660 is accessed to determine if items 80 are found therein. If items 80 are found in the personal news list 660 then processing proceeds to operation 810. In operation 810, the next item 80 is downloaded to the cellular terminal 10. Thereafter, in operation 820 the item 80 is removed from the personal news list 660 and processing loops back to operation 800. If no further items 80 remain in the personal news list 660, then processing proceeds to operation 510. In operation 510, the cellular terminal is disconnected from the content provider 40 or news finder server 35. Thereafter, processing proceeds to operation 520 where it is determined if all content providers 40 or servers 35 have been checked. If all content providers 40 or servers 35 have not been checked then processing loops back to operation 440. Otherwise, processing proceeds operation 530 were processing terminates.

Using the foregoing embodiments of the present invention, a user is able to designate topics 70 and items 80 of interest and have those topics and items of interest downloaded and continuously available in the user's cellular terminal. Therefore, the user need not continuously access the Internet for web sites in order to receive the most current information available. Further, a content provider 40 is able to designate the length of time an individual may retain information provided by content provider 40. In addition, the user may designate the frequency for which information may be updated. Utilizing the embodiments of the present invention a considerable savings in cellular phone access time is achieved while providing the most current information to the user.

While we have shown and described only a few examples herein, it is understood that numerous changes and modifications as known to those skilled in the art could be made to the present invention. Therefore, we do not wish to be limited to the details shown and described herein, but intend to cover all such changes modifications as are encompassed by the scope of the appended claims.

We claim:

1. A method of accessing, downloading, storing, and retrieving information from a content provider onto a cellular terminal, said method comprising:

activating the cellular terminal to select an item of information;

activating the cellular terminal to search the Internet for content providers having the item of information;

downloading the item of information from one of the content providers to a memory in the cellular terminal;

time stamping the item of information with a best before time stamp;

activating the cellular terminal to specify an update period for the item of information;

activating the cellular terminal periodically to determine whether the best before time has expired;

if the best before time has expired, eliminating the item of information from the memory of the cellular terminal;

activating the cellular terminal at time intervals based on the specified update period to contact the one of the service providers to determine whether a new update exists for the item of information; and if a new update exists, downloading the new update from the one of the content providers to the memory in the cellular terminal.

2. The method recited in claim 1, wherein the searching the Internet for content providers having the item of information comprises activating a news finder server within a separate computer system from the cellular terminal and the content provider.

3. The method recited in claim 2, wherein activating the news finder server includes:

storing items of information in a personal news list associated with an individual user and accessible only by the individual user via a cellular terminal.

4. The method recited in claim 1, wherein downloading the new update is accomplished by the cellular terminal without any action or knowledge required from a user of the cellular terminal.

5. The method recited in claim 1, wherein eliminating the item of information is accomplished by the cellular terminal without any action or knowledge required by a user of the cellular terminal.

6. The method recited in claim 1, wherein selecting the item of information comprises selecting an information topic, and selecting one of a plurality of items of information within the information topic.

7. A storage medium having stored thereon instructions which when executed cause accessing, downloading, storing, and retrieving of information from a content provider onto a cellular terminal by:

activating the cellular terminal to select an item of information;

searching the Internet for content providers having the item of information;

downloading the item of information from one of the content providers to a memory in the cellular terminal;

time stamping the item of information with a best before time stamp;

activating the cellular terminal to specify an update period for the item of information;

activating the cellular terminal periodically to determine whether the best before time has expired;

if the best before time has expired, eliminating the item of information from the memory of the cellular terminal;

activating the cellular terminal at time intervals based on the specified update period to contact the one of the service providers to determine whether a new update exists for the item of information; and if a new update exists, downloading the new update from the one of the content providers to the memory in the cellular terminal.

8. The storage medium recited in claim 7, wherein the instructions when executed cause searching of the Internet for content providers having the item of information by activating a news finder server, said news finder sever is within a separate computer system from the cellular terminal and the content provider.

9. The storage medium recited in claim 8, wherein activating the news finder server includes:

storing items of information in a personal news list associated with an individual user and accessible only by the individual user via a cellular terminal.

10. The storage medium recited in claim 7, wherein eliminating the item of information is accomplished by the cellular terminal without any action or knowledge required from a user of the cellular terminal.

11. The storage medium recited in claim 7, wherein downloading the new update is accomplished by the cellular terminal without any action or knowledge required from a user of the cellular terminal.

12. The storage medium recited in claim 7, wherein the instructions cause the cellular terminal to select the item of information by selecting an information topic, and selecting one of a plurality of items of information within the information topic.

13. A system for accessing, downloading, storing, and retrieving information from a content provider onto a cellular terminal, said system comprising an information finder to search the Internet for a selected item of information;

a cellular terminal to communicate to a cellular network and the Internet, said cellular terminal including:

(a) a news finder data file to store the item of information in a memory of the cellular terminal with an associated best before time stamp; and (b) a time stamp check module to check the best before time stamp and eliminate the item of information from the memory of the cellular terminal when the best before time stamp has expired.

14. The system recited in claim 13, wherein the information finder is responsive to expiration of an update period to access the Internet for a new update of the item of information and is responsive to locating of the new update to download the new update.

15. The system recited in claim 14, wherein the update period is specified by a user of the cellular terminal.

16. The system recited in claim 13, wherein the information finder resides in a server connected to the Internet and separate from the cellular terminal.

17. The system recited in claim 13, wherein the information finder includes a personal news list that contains items of information specified by a user of the cellular terminal.

18. The system recited in claim 13, wherein the best before time stamp is specified by the content provider.

19. The system recited in claim 13, wherein the information finder resides in the cellular terminal.

* * * * *